United States Patent
Takida et al.

[11] Patent Number: 6,137,695
[45] Date of Patent: Oct. 24, 2000

[54] SELF-OSCILLATION TYPE SWITCHING POWER SUPPLY AND METHOD

[75] Inventors: Akihiko Takida, Kyoto; Tomohiro Yamada, Nagaokakyo, both of Japan

[73] Assignee: Murata Manufacturing co., Ltd., Japan

[21] Appl. No.: 09/225,164

[22] Filed: Jan. 4, 1999

[30] Foreign Application Priority Data

Jan. 6, 1998 [JP] Japan ................................. 10-000682

[51] Int. Cl.$^7$ ................................................ H02M 3/335
[52] U.S. Cl. ................................................ 363/19
[58] Field of Search ................................ 363/18, 19, 20, 363/21, 15–17; 323/902

[56] References Cited

U.S. PATENT DOCUMENTS

| | | | |
|---|---|---|---|
| 5,675,479 | 10/1997 | Tani et al. | 363/19 |
| 5,864,472 | 1/1999 | Peterson | 363/18 |
| 5,995,382 | 11/1999 | Miyazaki et al. | 363/19 |

*Primary Examiner*—Peter S. Wong
*Assistant Examiner*—Gary L. Laxton
*Attorney, Agent, or Firm*—Ostrolenk, Faber, Gerb & Soffen, LLP

[57] ABSTRACT

A self-oscillation type switching power supply apparatus comprises a transformer T having a primary winding N1, a secondary winding N2, and a feedback winding $N_B$, a switching transistor Q1 to interrupt current in the primary winding supplied with an input power supply voltage, a feedback signal being provided from the feedback winding $N_B$ and a rectifying smoothing circuit connected to the secondary winding. The self-oscillation type switching power supply apparatus further comprises a controlling transistor Q3 to control a positive feedback signal for the switching transistor Q1 from the feedback winding $N_B$, and a detector detecting a flyback voltage produced in the feedback winding $N_B$ when the switching transistor Q1 is turned off, and changing-over the state of the controlling transistor Q3 to keep the switching transistor Q1 in the off-state when the flyback voltage goes lower than a predetermined value.

18 Claims, 5 Drawing Sheets

SELF-OSCILLATION TYPE SWITCHING POWER SUPPLY AND METHOD

BACKGROUND OF THE INVENTION

1. Field of the Invention

The present invention relates to a self-oscillation type switching power supply apparatus.

2. Description of the Related Art

As a self-oscillation type switching power supply apparatus, ringing choke converters have been conventionally used in most cases. FIG. 6 is a circuit diagram showing a conventional ringing choke converter. As seen in FIG. 6, a switching transistor Q1 is connected in series with a primary winding N1 of a transformer T. A controlling circuit including a phototransistor PT as a photodetecting element of a photocoupler is connected to a feedback winding $N_B$ of the transformer T. Further, a controlling transistor Q2 is connected across the gate—source of the switching transistor Q1.

A rectifying smoothing circuit comprising a rectifying diode D3 and a smoothing capacitor is connected across a secondary winding N2 of the transformer T. For the output of the rectifying smoothing circuit, a resistor voltage-dividing circuit comprising resistors R9, R10, and a voltage detecting circuit comprising a shunt regulator SR, a light emitting diode PD of the above-mentioned photocoupler, and a resistor R8 are provided.

The operation of the circuit shown in FIG. 6 will be now described. At start up when a power supply is put to work, voltage is applied to the gate of the switching transistor Q1 through a starting resistor R1, so that the switching transistor Q1 is turned on. Thereby, an input power supply voltage is applied to the primary winding N1 of the transformer T, so that a voltage is produced in the feedback winding $N_B$ in the same direction as that in the primary winding N1. The voltage signal is provided as a positive feedback signal to the gate of the switching transistor Q1 through a resistor R2 and a capacitor C2. The voltage produced in the feedback winding $N_B$ also causes a charging current to flow to a capacitor C3 through a diode D1, resistors R3, R5. and a photocoupler PT. When the charging voltage of the capacitor C3 exceeds a base—emitter forward voltage of the controlling transistor Q2, the controlling transistor Q2 is turned on. Thereby, the gate—source voltage of the switching transistor Q1 becomes substantially zero, so that the switching transistor Q1 is forced to turn off. At this time, a voltage is produced in the secondary winding of the transformer T in the forward direction with respect to the rectifying diode D3, and energy stored in the transformer T while Q1 is on is released through the secondary winding N2. At this time, the capacitor C3 is reverse-charged with the flyback voltage of the feedback winding $N_B$ supplied through resistors R6, R7 and a diode D2.

When the voltage of the capacitor C3 gets to be lower than the base—emitter forward voltage of the controlling transistor Q2, the controlling transistor Q2 is turned off. The energy stored in the transformer T is released from the secondary, and the current in the rectifying diode D3 becomes zero. Then, the respective winding voltages of the transformer T become zero. The circuit is returned to its initial state, and then, the switching transistor Q1 is turned on. The above-described operation is then repeated periodically.

The output voltage on the load side is detected as a voltage divided by the resistors R9, R10. The divided voltage is applied as a detection voltage and a control voltage for the shunt regulator SR. The shunt regulator SR regulates the conducting quantity of electricity for the light emitting diode PD of the photocoupler in dependence on the detection voltage. By the regulation, the quantity of light accepted by the phototransistor PT, as a photodetector of the photocoupler, is changed, causing the impedance of the phototransistor PT to change. As a result, the charging time constant of the capacitor C3 is changed. As the output voltage is lower, so the charging time constant is higher. That is, as the output voltage is lower, the period from the time when the switching transistor Q1 is turned on until it is forced to be turned off by the controlling transistor Q2, namely, the "on"—state time period of the switching transistor Q1 is longer. This acts so that the output voltage is increased. Thus, a constant voltage control for keeping the output voltage constant is achieved.

In the conventional self-oscillation type switching power supply apparatus as shown in FIG. 6, when the output current Io is increased and the output voltage Vo is decreased, the impedance of the phototransistor PT is increased by the feedback control carried out through the photocoupler. However, in the event that the output power Io goes into an overcurrent state, and the impedance of the phototransistor PT reaches a maximum, the "on"—state time period of the switching transistor Q1 can not be further lengthened. As a result, the output voltage Vo begins to drop. FIG. 7 is a graph showing the relation between the output current and the output voltage. With droping of the output voltage Vo, the flyback voltage of the feedback winding $N_B$ is reduced, and the reverse-charge voltage of the capacitor C3 is reduced, so that the base—emitter voltage Vbe of Q2 is directed toward the negative with difficulty. That is, Q2 is turned on in a short time, so that the "on"—state time period of Q1 is reduced to a minimum.

In the event that the load is short-circuited, and the output voltage Vo gets to be substantially zero, the controlling transistor Q2 is turned on and off, repeatedly, and the switching transistor Q1 is turned on and off repeatedly, with short "on"—state time periods. As a result, a constant short circuit current flows. There is a danger that the short-circuit current causes not only a useless power loss but also abnormal heating of and damage to the switching transistor Q1, the rectifying diode D3, and the load.

SUMMARY OF THE INVENTION

An object of the present invention is to provide a self-oscillation type switching power supply apparatus which solves the above problems caused when the device is in an overload state.

According to the present invention, a self-oscillation type switching power supply apparatus comprises a transformer having a primary winding, a secondary winding, and a feedback winding, a switching transistor to interrupt current in the primary winding supplied with an input power supply voltage, a feedback signal being provided from the feedback winding, a rectifying smoothing circuit connected to the secondary winding, a controlling transistor to control a feedback signal for the switching transistor from the feedback winding and a detector detecting a flyback voltage produced in the feedback winding when the switching transistor is turned off and for changing-over the state of the controlling transistor to keep the switching transistor in an off-state when the flyback voltage attains a predetermined value and in the preferred embodiment, when the absolute value of the flyback voltage goes lower than the predetermined value.

The flyback voltage produced in the feedback winding when the switching transistor is turned off is proportional to the turn ratio of the secondary winding of the transformer to the feedback winding and also a voltage outputted from the secondary winding. Accordingly, when the load gets to be in a short-circuit state, the flyback voltage produced in the feedback winding becomes lower than a predetermined value. Therefore, the state of the controlling transistor is changed-over, forcing the switching transistor to be off. Thus, in this state, no current flows in the switching transistor and the secondary of the transformer. This eliminates the above-described problems such as abnormal heating and so forth.

In addition, the overcurrent state of the load is detected indirectly, by detection of the flyback voltage produced in the feedback winding. The loss of power, which will be caused by a resistor, can be avoided, in contrast to the case where the resistor for current detection is connected in an output current path for the load, and with a voltage drop caused by the resistor, the output current is detected.

For the purpose of illustrating the invention, there is shown in the drawings several forms which are presently preferred, it being understood, however, that the invention is not limited to the precise arrangements and instrumentalities shown.

DETAILED DESCRIPTION OF EMBODIMENTS OF THE INVENTION

Hereinafter, the preferred embodiments of the present invention are explained in detail with reference to the drawings.

Figure 1:
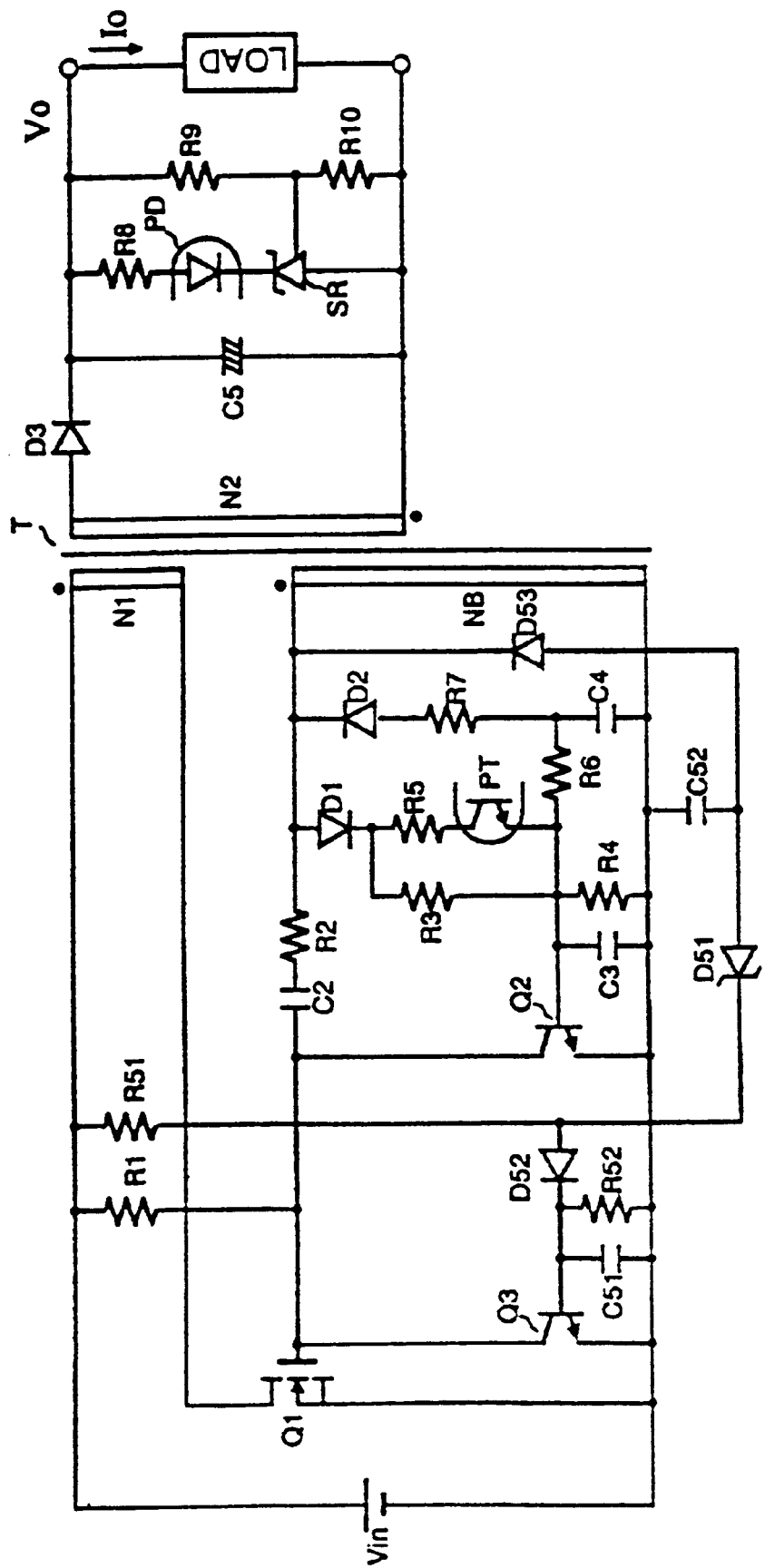
FIG. 1 is a circuit diagram showing a self-oscillation type switching power supply apparatus according to an embodiment of the present invention.

FIG. 1 is a circuit diagram of the self-oscillation type switching power supply apparatus. A switching transistor Q1 is connected in series with a primary winding N1 of a transformer T. For a feedback winding N5 of the transformer T, a feedback circuit for the switching transistor Q1 is provided. For a secondary winding N2 of the transformer T, a rectifying smoothing circuit comprising a rectifying diode D3 and a smoothing capacitor C5 are provided. Further, for the output of the rectifying smoothing circuit, a resistor voltage-dividing circuit comprising resistors R9, R10, and a voltage detecting circuit comprising a shunt regulator SR, a light emitting diode PD of a photocoupler, and a resistor R8 are provided.

In the above feedback circuit, Q3 designates a controlling transistor for the switching transistor Q1. A resistor R51, a diode D52, a resistor R52, and a capacitor C51 make up a circuit for applying a bias voltage to the controlling transistor Q3. A diode D53 and a capacitor C52 connected to the feedback winding $N_B$ form a rectifying smoothing circuit. A Zener diode D51 forms a constant voltage circuit for suppressing the bias voltage to be applied to the above controlling transistor Q3 when the output voltage from the above rectifying smoothing circuit exceeds a predetermined value.

The operation of the circuit shown in FIG. 1 will be now described. At start up when the power supply is put to work, a voltage is applied to the gate of the switching transistor Q1 through a starting resistor R1, so that the switching transistor Q1 is turned on. Thereby, an input power supply voltage is applied to the primary winding N1 of the transformer T, and a voltage in the same direction as that in the primary winding N1 is produced in the feedback winding $N_B$. This voltage signal is given as a positive feedback signal to the gate of the switching transistor Q1 through a resistor R2 and a capacitor C2. On the other hand, the voltage produced in the feedback winding $N_B$ causes charging current to flow to the capacitor C3 through a diode D1, resistors R3, R5, and a phototransistor PT of a photocoupler. When the charging voltage of the capacitor C3 exceeds the base—emitter forward voltage of the controlling transistor Q2, the controlling transistor Q2 is turned on. Thereby, the gate—source voltage of the switching transistor Q1 becomes substantially zero, so that the switching transistor Q1 is forced to turn off. At this time, a forward voltage with respect to the rectifying diode D3 is produced in the secondary winding of the transformer T. Thus, an energy stored in the transformer T during the "on"—state time period of Q1 is released through the secondary winding N2. Further, the capacitor C3 is reverse-charged with the flyback voltage of the feedback winding $N_B$ applied through the resistors R6, R7, and the diode D2.

When the voltage of the capacitor C3 becomes lower than the base—emitter forward voltage, the controlling transistor Q2 is turned off. When energy stored in the transformer T is released from the secondary, and the current in the rectifying diode D3 becomes zero, the respective winding voltages of the transformer T become zero. Thus, the circuit is returned to its initial state, and then, the switching transister Q1 is turned on. The above operation is then repeated.

The output voltage on the load side is detected as a voltage divided by the resistors R9, R10. The divided voltage is applied as a detection voltage and a control voltage for the shunt regulator SR. The quantity of electricity conducting in the light emitting diode PD of the photocoupler is changed in dependence on the detection voltage, and thereby, the quantity of light accepted by the phototransistor PT as a light detecting element of the photocoupler is changed, so that the impedance is changed. As a result, the charging time constant of the capacitor C3 is changed. As the output voltage is lower, so the charging time constant is larger. Thus, as the output voltage is decreased, the period from the time when the switching transistor Q1 is turned on until it is forced to turn off by the controlling transistor Q2, namely, the "on"—state time period of the switching transistor Q1 becomes longer. This acts so that the output voltage is increased. Thus, a constant voltage control for keeping the output voltage constant is achieved.

Figure 2:
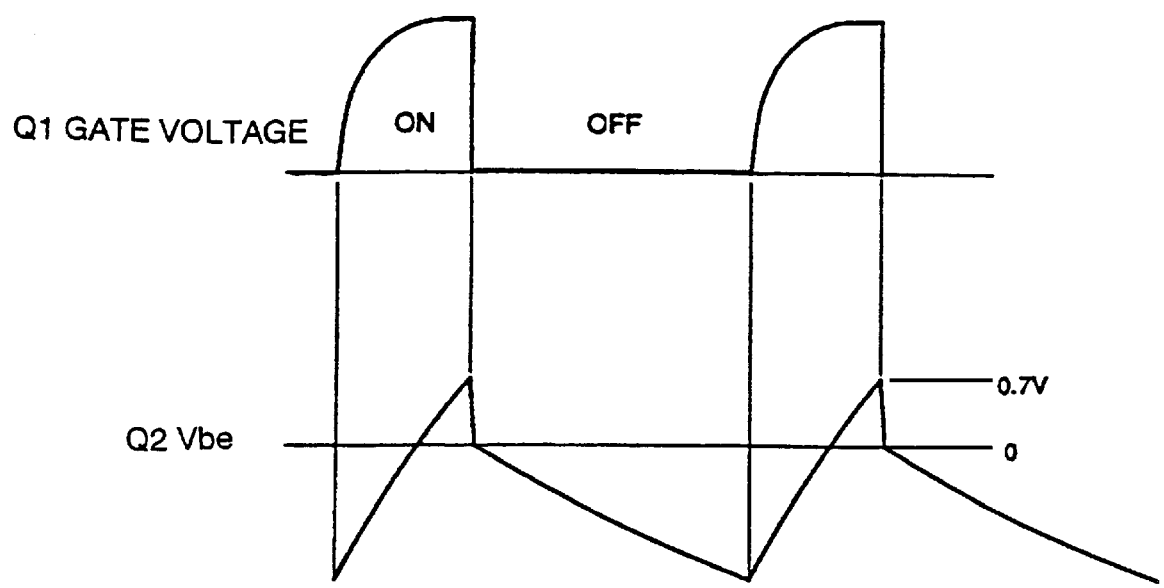
FIG. 2 is a waveform chart of voltage produced in a feedback winding $N_B$ of the same device.

FIG. 2 is a waveform chart of the gate voltage of the switching transistor Q1 and the base—emitter voltage Vbe of the controlling transistor Q2, shown in FIG. 1. In the steady state, the base—emitter voltage of the controlling transistor Q2 is increased with the charging time constant of the above-described time constant circuit. When the voltage rises to the base—emitter forward voltage (about 0.7 V) of Q2, Q2 is turned on, forcing the switching transistor Q1 to turn off. In the case where the load begins to draw more current and the output voltage Vo is about to decrease, the time constant of the above-described time constant circuit is increased, due to the negative feedback control carried out through the above photocoupler, Thus, the rising inclination of Vbe shown in FIG. 2 becomes small. That is, the time until the switching transistor Q1 is forced to turn off, namely, the "on"—state time period of Q1 is longer.

Figure 3:
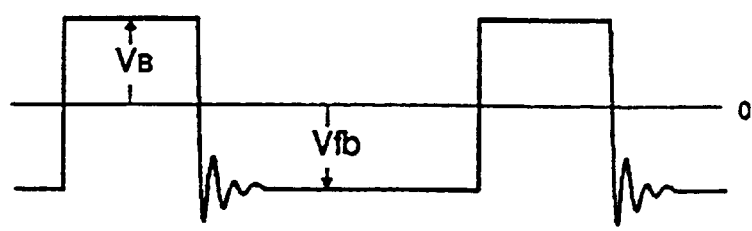
FIG. 3 is waveform chart in relevant respective portions of the same device.

FIG. 3 is a wave form chart of voltage produced in the feedback winding $N_B$. The feedback voltage $V_B$ produced during the "on"—state time period of the switching transistor Q1 is expressed as $V_B$=Vin (nb/nl), in which Vin is an input power supply voltage, n1 is the number of turns of the primary winding N1, and nb is the number of turns of the feedback winding $N_B$. In addition, the flyback voltage Vfb produced in the feedback winding $N_B$ during the "off"—state time period of the switching transistor Q1 is expressed as Vfb=Vo (nb/n2). Accordingly, with the output voltage Vo reduced into an overload state, the flyback voltage Vfb produced in the feedback winding $N_B$ is decreased.

Figure 4:
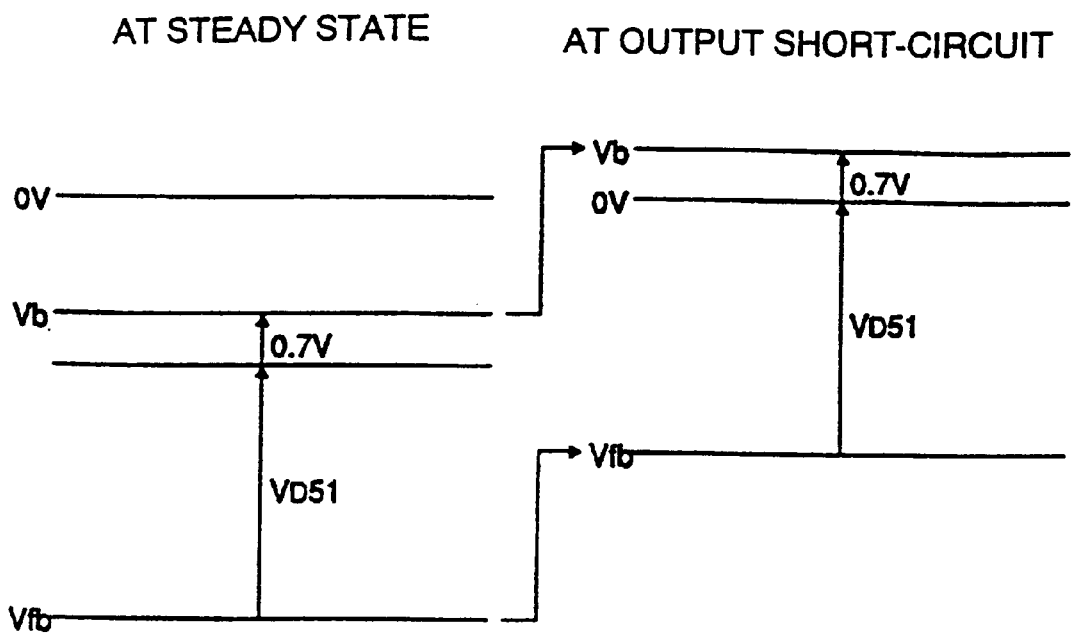
FIG. 4 is a diagram illustrating an example of the change of the flyback voltage produced in the feedback voltage of the same device, and the base voltage of the controlling transistor Q3.

FIG. 4 is a diagram showing an example of the change of the above-described flyback voltage Vfb and the base potential Vb (the base—emitter voltage) of the controlling transistor Q3 shown in FIG. 1, caused by variations in the load. In the rated load state, the base potential of the controlling transistor Q3 is equal to the sum of the output voltage Vfb of the rectifying smoothing circuit including the diode D53 and the capacitor C52, the Zener voltage VD51 of the Zener diode D51, and the forward voltage of the diode D52 of about 0.7V. The Zener voltage of the Zener diode D51 and the turn ratio of the secondary winding N2 of the transformer T to the feedback winding $N_B$ are so set that Vb is up to +0.7 V at the steady-state time as seen in FIG. 4. When the output gets to be in a short-circuit state, the absolute value of the flyback voltage Vfb is reduced, resulting in increase of the base potential Vb of the controlling transistor Q3. When Vb rises to the base—emitter forward voltage (about 0.7 V) of Q3, Q3 is turned on. Thereby, the gate potential of the switching transistor Q1 becomes substantially zero V, causing Q1 to be off. This state is maintained. Thus, the output current is completely cut off.

Figure 5:
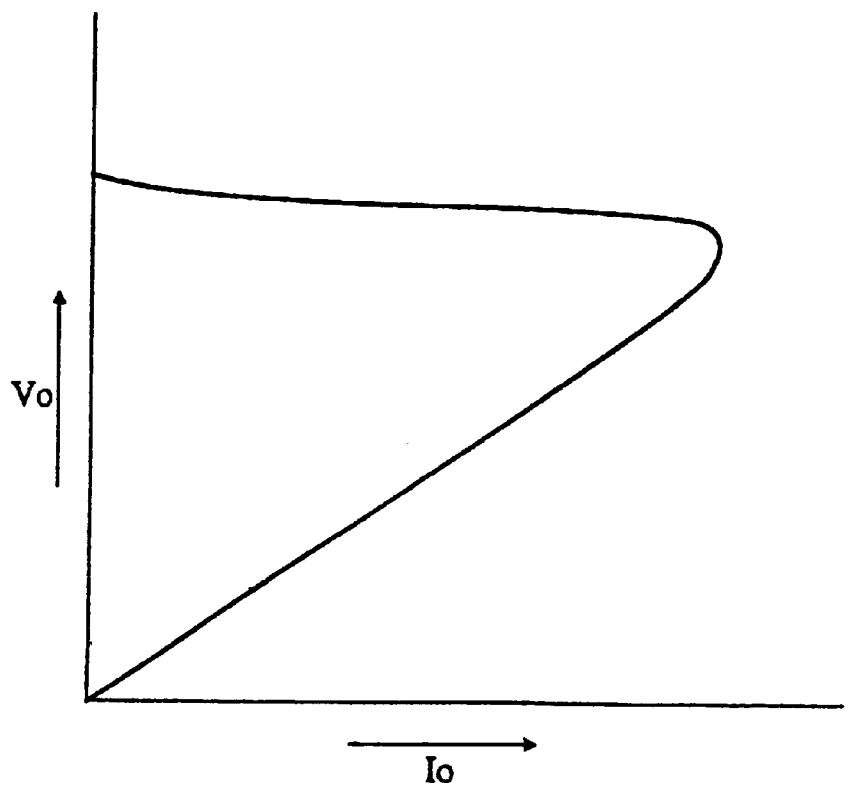
FIG. 5 is a graph showing a characteristic of the output voltage versus the output current of the same device.
Figure 6:
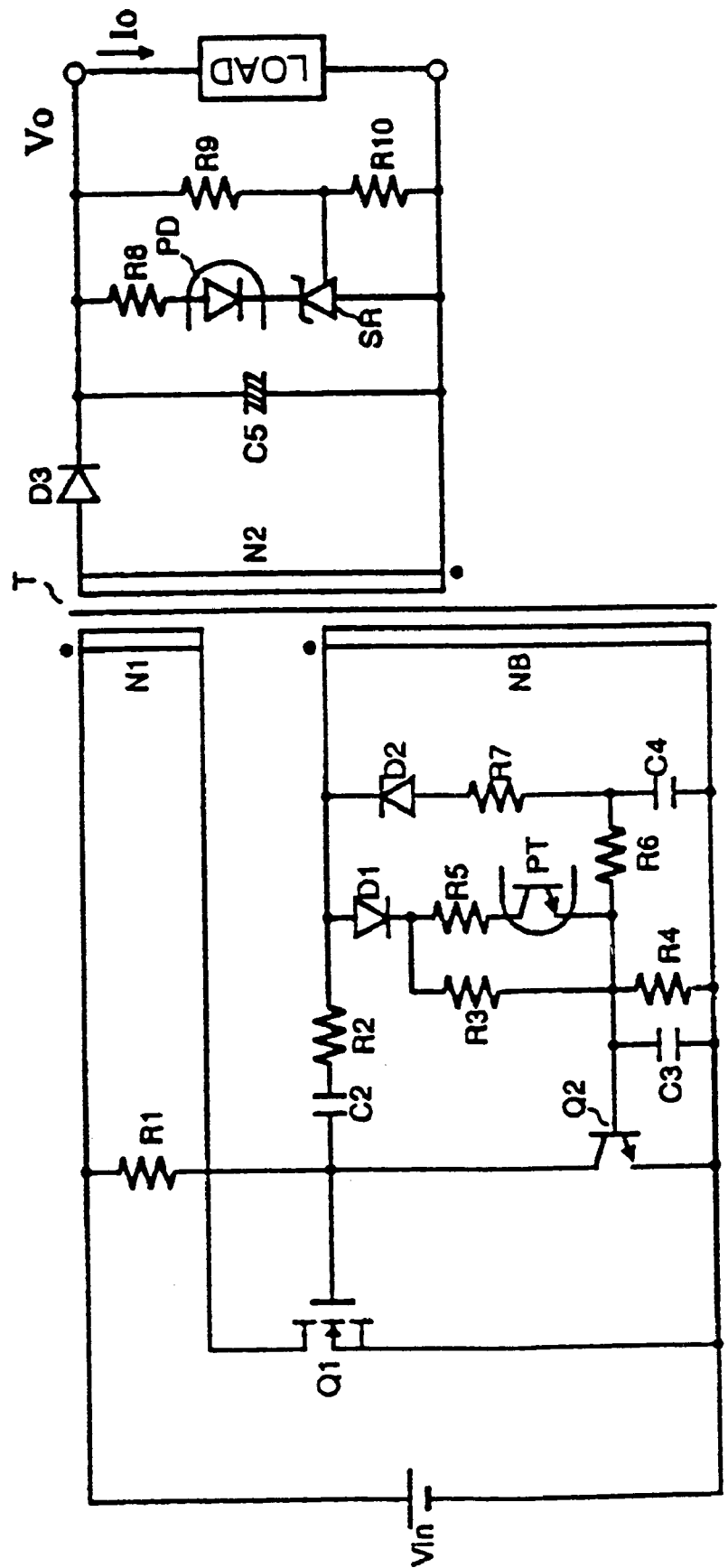
FIG. 6 is a circuit diagram showing a conventional self-oscillation type switching power supply apparatus.
Figure 7:
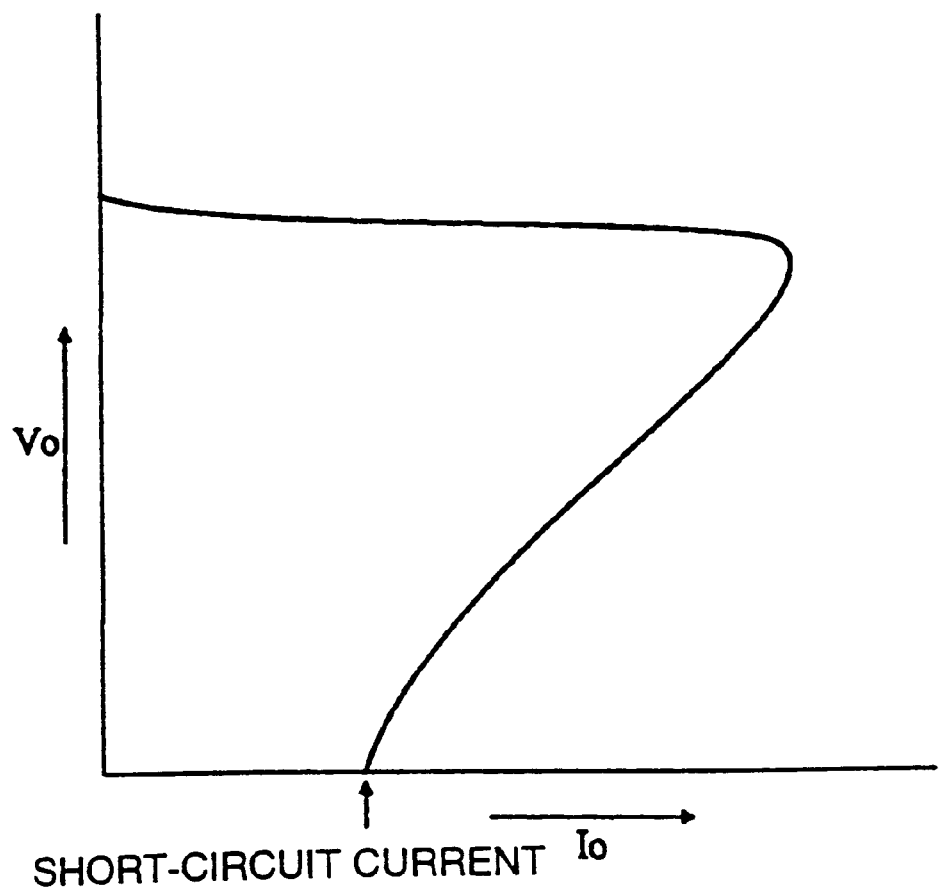
FIG. 7 is a graph showing a characteristic of the output voltage versus the output current of the conventional self-oscillation type switching power supply apparatus.

FIG. 5 is a graph showing a characteristic of the output voltage Vo versus the output current Io when the output is short-circuited. As compared with the example illustrated in FIG. 7, it is evident that the output voltage Vo, once the output is short-circuited, drops to zero, and the output current Io becomes zero.

The capacitor C51 shown in FIG. 1, forming the charging time constant circuit together with the resistor R51, delays the rising of the base potential of the controlling transistor Q3 when the input power supply voltage Vin is applied. This prevents that Q3 goes on immediately after the power supply Vin is applied resulting in the off-condition of Q1. More particularly, the self-oscillation, caused by the switching transistor Q1, is started before the base potential of the controlling transistor Q3 is increased to a potential required for the on condition of Q3, due to the time constant circuit. A negative voltage is produced in the rectifying smoothing circuit including the diode D53 and the capacitor C52. Thus, the on condition of the controlling transistor Q3 is avoided at the steady—state time. Moreover, the resistor R52 together with the resistor R51, forming the resistor voltage-dividing circuit, causes the capacitor C51 to discharge when the input power supply is stopped. Accordingly, in the event that the output gets to be in an overcurrent state by short-circuiting of the output and so forth, the switching transistor Q1 is kept in the off condition, and the cause of the overcurrent can then be eliminated. The input power supply can then be turned off and thereafter applied again. Thus, the device can be returned to the steady state.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A self-oscillation type switching power supply comprising:
    a transformer having a primary winding, a secondary winding and a feedback winding;
    a switching transistor to interrupt current in said primary winding supplied with an input power supply voltage, the switching transistor performing an on-off operation having an on state and an off state, a feedback signal being provided by said feedback winding;
    a rectifying smoothing circuit being connected to said secondary winding for providing an output voltage and an output current;
    a controlling circuit controlling the on-off operation of said switching transistor in response to the feedback signal and a signal responsive to the output voltage, said controlling circuit including a first controlling transistor;
    a detector detecting a flyback voltage produced in said feedback winding when said switching transistor is turned off; and
    a second controlling transistor coupled to the detector and maintaining said switching transistor in the off state such that the output current becomes zero once the flyback voltage attains a predetermined value.

2. The self-oscillation type switching power supply of claim 1, wherein the second controlling transistor changes over when an absolute value of the flyback voltage goes lower than the predetermined value.

3. The self-oscillation type switching power supply of claim 1, wherein the feedback signal is a positive feedback signal causing the switching transistor to remain on and the signal responsive to the output voltage causes said switching transistor to be turned off if the output voltage exceeds a preset value.

4. The self-oscillation type switching power supply of claim 1, wherein the detector comprises a detecting circuit coupled to the second controlling transistor for changing a control voltage to the second controlling transistor in response to a change in the flyback voltage.

5. The self-oscillation type switching power supply of claim 4, wherein the detecting circuit changes the control voltage to the second controlling transistor when the absolute value of the flyback voltage decreases during an overload condition, the control voltage to said second controlling transistor changes to cause said second controlling transistor to turn off said switching transistor.

6. The self-oscillation type switching power supply of claim 5, wherein the detecting circuit comprises a rectifying smoothing circuit coupled to the feedback winding and an R-C circuit coupled to a control input of the second controlling transistor.

7. The self-oscillation type switching power supply of claim 1, wherein the controlling circuit includes a photo coupler coupling the signal responsive to the output voltage to the first controlling transistor.

8. The self-oscillation type switching power supply of claim 1, wherein when the flyback voltage attains the predetermined value, the second controlling transistor controls the switching transistor to the off state wherein the output current drops substantially to zero when the output voltage drops substantially to zero.

9. A method for controlling a self-oscillation type switching power supply having a transformer including a primary winding, a secondary winding and a feedback winding, the method comprising controlling a switching transistor to interrupt current in said primary winding supplied with an input power supply voltage, the switching transistor performing an on-off operation having an on state and an off state, providing a feedback signal from said feedback winding, providing an output voltage and output current from a rectifying smoothing circuit connected to said secondary winding, providing a first controlling transistor with the feedback signal for controlling said switching transistor, controlling with a first controlling transistor the on-off operation of said switching transistor in response to the feedback signal and a signal responsive to the output voltage; detecting a flyback voltage produced in said feedback winding when said switching transistor is turned off and, with a second controlling transistor in response to the detected feedback voltage said switching transistor in the off state such that the output current becomes zero, once the flyback voltage attains a predetermined value.

10. The method of claim 9, wherein a state of the second controlling transistor changes over when an absolute value of the flyback voltage goes lower than the predetermined value.

11. The method of claim 9, wherein the feedback signal is a positive feedback signal causing the switching transistor to remain on and the signal responsive to the output voltage causes said switching transistor to be turned off if the output voltage exceeds a preset value.

12. The method of claim 9, wherein the step of detecting comprises changing a control voltage to the second controlling transistor in response to a change in the flyback voltage.

13. The method of claim 12, wherein the step of detecting changes the control voltage to the second controlling transistor when the absolute value of the flyback voltage decreases during an overload condition, the control voltage to said second controlling transistor changes to cause said second controlling transistor to turn off said switching transistor.

14. The method of claim 13, wherein the step of detecting comprises rectifying and smoothing said flyback voltage from the feedback winding and providing the rectified, smoothed flyback voltage to an R-C circuit coupled to a control input of the second controlling transistor.

15. The method of claim 9, wherein the step of controlling the on-off operation includes the step of providing the signal responsive to the output voltage to the first controlling transistor via a photo coupler.

16. The method of claim 9, wherein the step of changing over comprises controlling the second controlling transistor so that when the flyback voltage attains the predetermined value, the second controlling transistor controls the switching transistor to the off state wherein the output current drops substantially to zero when the output voltage drops substantially to zero.

17. A method for controlling a self-oscillation type switching power supply having a transformer having a primary winding, a secondary winding and a feedback winding comprising:

controlling a switching transistor to interrupt current in the primary winding so that the switching transistor has an on state and an off state;

sensing a feedback signal from the feedback winding;

sensing an output voltage from the secondary winding, switching via a first controlling transistor the switching transistor between the on and off state in dependence on the feedback signal and the output voltage; and further comprising sensing a flyback voltage produced in the feedback winding and maintaining with a second controlling transistor said switching transistor in the off state such that the output current becomes zero once the flyback voltage attains a predetermined value, wherein an output current of the secondary winding drops substantially to zero if the output voltage drops substantially to zero.

18. The method of claim 17 wherein the switching transistor is switched to the off state when an absolute value of the flyback voltage goes lower than the predetermined value.

* * * * *